United States Patent
Whittington

(10) Patent No.: US 11,339,709 B2
(45) Date of Patent: May 24, 2022

(54) ELECTRIC MASS AIRFLOW CONTROL SYSTEM

(71) Applicant: Venomaire, LLC, Draper, UT (US)

(72) Inventor: Daniel William Whittington, Draper, UT (US)

(73) Assignee: Venomaire, LLC, Draper, UT (US)

( * ) Notice: Subject to any disclaimer, the term of this patent is extended or adjusted under 35 U.S.C. 154(b) by 140 days.

(21) Appl. No.: 16/372,197

(22) Filed: Apr. 1, 2019

(65) Prior Publication Data
US 2019/0249594 A1    Aug. 15, 2019

Related U.S. Application Data

(63) Continuation of application No. 14/262,768, filed on Apr. 27, 2014, now abandoned.

(51) Int. Cl.
  *F02B 33/40* (2006.01)
  *F02D 41/00* (2006.01)
  *F02B 39/10* (2006.01)

(52) U.S. Cl.
  CPC ........... *F02B 33/40* (2013.01); *F02B 39/10* (2013.01); *F02D 41/0007* (2013.01); *Y02T 10/12* (2013.01)

(58) Field of Classification Search
  CPC ....... F02B 33/40; F02B 39/10; F02D 41/0007
  See application file for complete search history.

(56) References Cited

U.S. PATENT DOCUMENTS

| | | | |
|---|---|---|---|
| 6,062,026 A | 5/2000 | Woollenweber et al. | |
| 6,079,211 A | 6/2000 | Woollenweber et al. | |
| 2003/0110770 A1 | 6/2003 | Criddle et al. | |
| 2015/0176481 A1 | 6/2015 | Jaeger | |
| 2015/0308328 A1 | 10/2015 | Whittington | |
| 2017/0122229 A1 | 5/2017 | Ossareh et al. | |

FOREIGN PATENT DOCUMENTS

JP    2007077854 A  *  3/2007  ............. F02D 23/00

OTHER PUBLICATIONS

Machine translation of Description of JP-2007077854-A obtained from EPO (Year: 2007).*
Whittington, et al., Office Action dated Oct. 7, 2015 for U.S. Appl. No. 14/262,768.

* cited by examiner

*Primary Examiner* — Ngoc T Nguyen

(57) ABSTRACT

A system is disclosed for monitoring and controlling the air intake of combustion motor with a forced air turbine electronically coupled thereto for the purposes of controlling the same. A processor electrically linked to the forced air turbine electric motor controller and configured with defined parameters to correlate forced air turbine instructions with engine and intake air pressure conditions. The system includes sensors electrically coupled to the forced air turbine electric motor controller configured to send information from the air intake, forced air turbine, throttle position and other conditions of the engine coupled thereto. The forced air turbine electric motor controller is configured to control the air intake based upon the input received from the various sensors as compared to the data contained in the processor. The system provides turbine speed control to the mass of intake air.

20 Claims, 3 Drawing Sheets

ELECTRIC MASS AIRFLOW CONTROL SYSTEM

CROSS-REFERENCE TO OTHER APPLICATIONS

This patent application is a continuation of U.S. patent application Ser. No. 14/262,768 entitled "ELECTRIC MASS AIRFLOW TURBINE CONTROL SYSTEM" filed on Apr. 27, 2014 for Daniel William Whittington, which is hereby expressly incorporated by reference.

BACKGROUND OF THE INVENTION

1. Field of the Invention

This invention relates to the field of naturally aspirated combustion engines and, more particularly, to a system for increasing and controlling the air intake of naturally aspirated combustion engines.

2. Description of the Related Art

A naturally aspirated engine is one common type of reciprocating piston internal combustion engine that depends solely on atmospheric pressure to counter the partial vacuum in the induction tract to draw in combustion air.

In a naturally aspirated engine; air for combustion is drawn into the engine's cylinders by atmospheric pressure acting against a partial vacuum that occurs as the piston travels downward toward bottom dead center during the induction stroke. Because of the innate restriction in the engine's inlet tract which includes the intake manifold, a small pressure drop occurs as air is drawn in, resulting in a volumetric efficiency of less than 100 percent—and a less than complete air charge in the cylinder. The density of the air charge, and therefore the engine's maximum theoretical power output, in addition to being influenced by induction system restriction, is also affected by engine speed and atmospheric pressure, the latter which decreases as the operating altitude increases.

It is therefore desirable to provide intelligent operational control to maximize engine performance and to provide an improved air intake management system. It is desired that such intelligent operational control system be configured to include and power an electric turbine coupled to the internal combustion engine to increase the mass of air intake to increase performance and improve gas mileage.

SUMMARY OF THE INVENTION

From the foregoing discussion, it should be apparent that a need exists for an electric mass airflow turbine control system. Beneficially, such an apparatus would overcome many of the difficulties with prior art.

The present invention has been developed in response to the present state of the art, and in particular, in response to the problems and needs in the art that have not yet been fully solved by currently available aparati. Accordingly, the present invention has been developed to provide a forced air turbine coupled to an internal combustion engine, the forced air turbine comprising: a processor having a condition map in persistent memory, the condition map associating electric motor instructions with engine and turbine conditions, the processor configured to receive sensor measurements; a plurality of sensors affixed to the processor, each sensor sensing one of a throttle position, an air flow measurement, a manifold absolute pressure, an air intake measurement, a boost pressure measurement, engine rotations per minute (RPM), turbine fan RPM, and a turbine fan temperature; and a forced air turbine electric motor affixed to an internal combustion engine.

In some embodiments, the processor comprises a non-volatile computer readable medium storing a computer-executable instruction set having instructions for controlling the forced air turbine.

The processor may output an electronic instruction to a controller in response to measured air flow through a forced air turbine failing short of a target air flow defined in the computer-readable instructions, the controller increasing the RPM of the forced air turbine.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
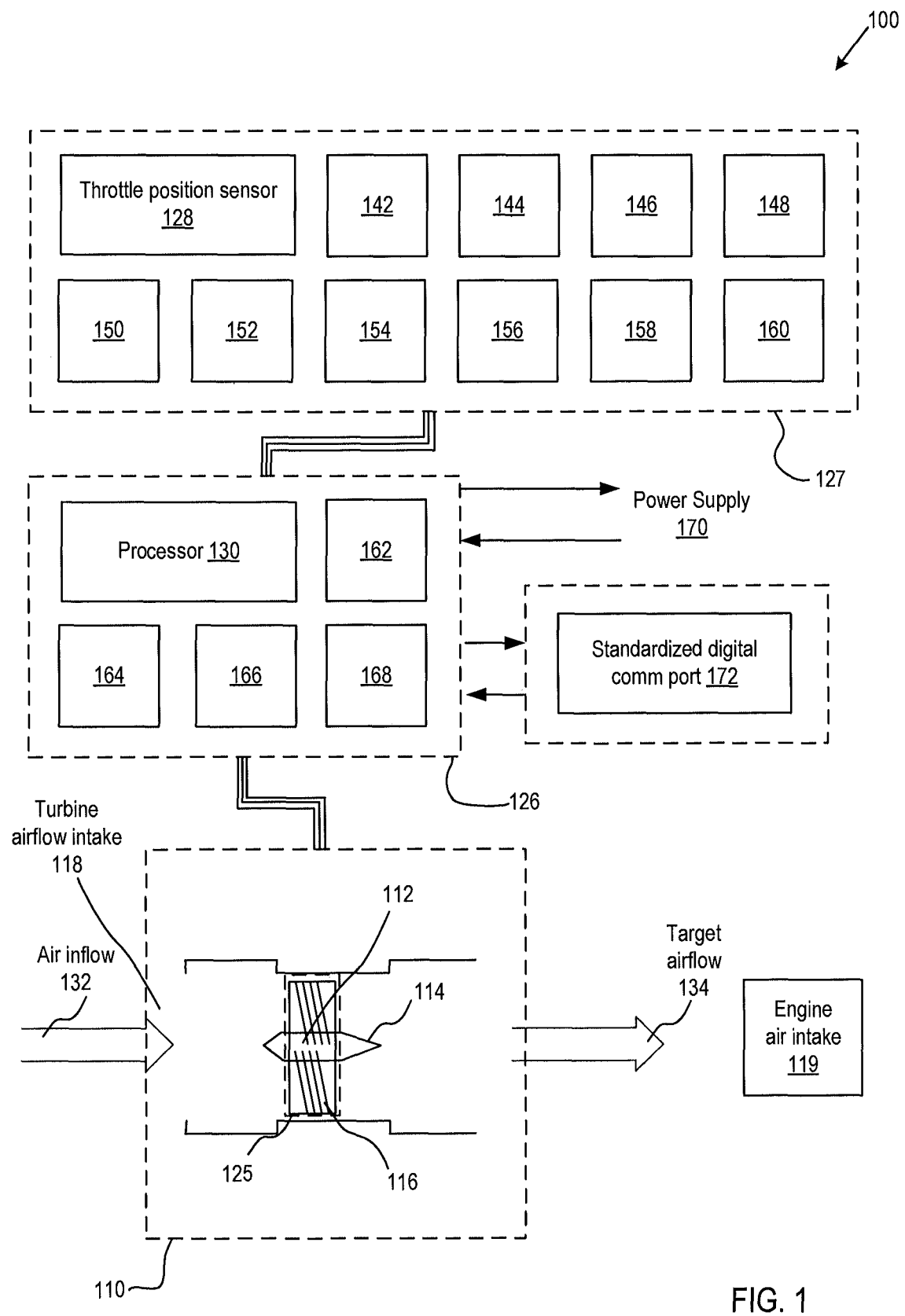
FIG. 1 is a block diagram of an electric mass airflow control system in accordance with the present invention.

FIG. 1 is a block diagram of an electric mass airflow control system 100 in accordance with the present invention. The system 100 comprises a throttle position sensor 128, sensors 142-160, a forced air turbine control system 126 comprising a processor 130, components 162-168, a forced air turbine 110 comprising a forced air turbine intake 118, an electric motor 112, an impeller shaft 114, turbine vanes 116, and an engine air intake 119.

As shown in FIG. 1, a Forced Air Turbine 110 comprises a Forced Air Turbine electric motor 112 which is connected to an impeller shaft 114 with turbine vanes 116 and is connected to the engine air intake 119. The Forced Air Turbine electric motor 112 is contained within the turbine and is interposed axially between the engine air intake housing 119 and Forced Air Turbine intake housing 118.

A Forced Air Turbine control system 126 for controlling the electric turbine is electrically coupled to the Forced Air Turbine electric motor 112. In an example embodiment, the Forced Air Turbine control system 126 contains a Processor 130 which is connected to the Throttle Position Sensor (TPS) 128. Throttle Position Sensor 128, the Processor 130, of the Forced Air Turbine control system 126, may also be connected to multiple sensors 127. Forced Air Turbine electric motor 112 is contained inside the impeller shaft 114 and is configured to apply a torque to the impeller shaft 114 and attached turbine vanes 116.

The processor 130 is programmed with multiple condition maps for the different turbine control schemes. The condition maps are configured to correlate a desired action of the 10 Forced Air Turbine electric motor 112, with determinable engine and turbine characteristics. The Processor 130 uses engine signals and sensor inputs 127 in conjunction with the condition map data stored in its memory to control the Forced Air Turbine electric motor 112. The Processor 130 controls the flow of power to the Forced Air Turbine electric motor 112. In an embodiment of the present invention, the Processor 130 functions to convert power to the Forced Air Turbine electric motor 112 from direct current (DC), supplied by an on-board vehicle battery or other electrical source, to an alternating current and/or modulated signal.

The Processor 130 of this invention is configured to control operation of the Forced Air Turbine electric motor 112 according to the programming contained in the condition map. Depending on the current operating conditions of the engine and the performance demanded by the driver, the system is configured to operate in the following mode:

The magnitude of Forced Air Turbine power that is supplied will vary depending on the particular operating conditions of the engine and is determined by the difference between current operating conditions and sensors, as programmed into the condition maps. Thus, if a driver is demanding that the engine provide maximum performance, the system will operate to activate optimal mass air flow. The system has the flexibility to accommodate different control algorithms for different applications.

Each Forced Air Turbine Sensor 127, is configured to monitor at least one of the following engine or Forced Air Turbine conditions: throttle position, mass air flow, manifold absolute pressure, intake air flow, Forced Air Turbine revolutions per minute, Forced Air Turbine temperatures, Processor temperatures, engine load, boost pressure, air temperature, intake manifold pressure, air intake temperature, accelerator position, accelerator change rate, fueling rate, engine temperature, engine timing, battery voltage, electric motor current flow, ambient temperature and pressure, brake pressure, clutch pressure and oil pressure.

Multiple sensors are coupled to the Forced Air Turbine Control System 126 which houses a Processor 130. The Processor 130 monitors the current sensed operating conditions of the engine and operates the electric motor of the turbine fan 112, according to predetermined operating instructions to achieve the desired engine intake air flow conditions.

Air 132 flows into the turbine airflow intake 118, then air 134 flows out of the turbine 110.

Figure 2:
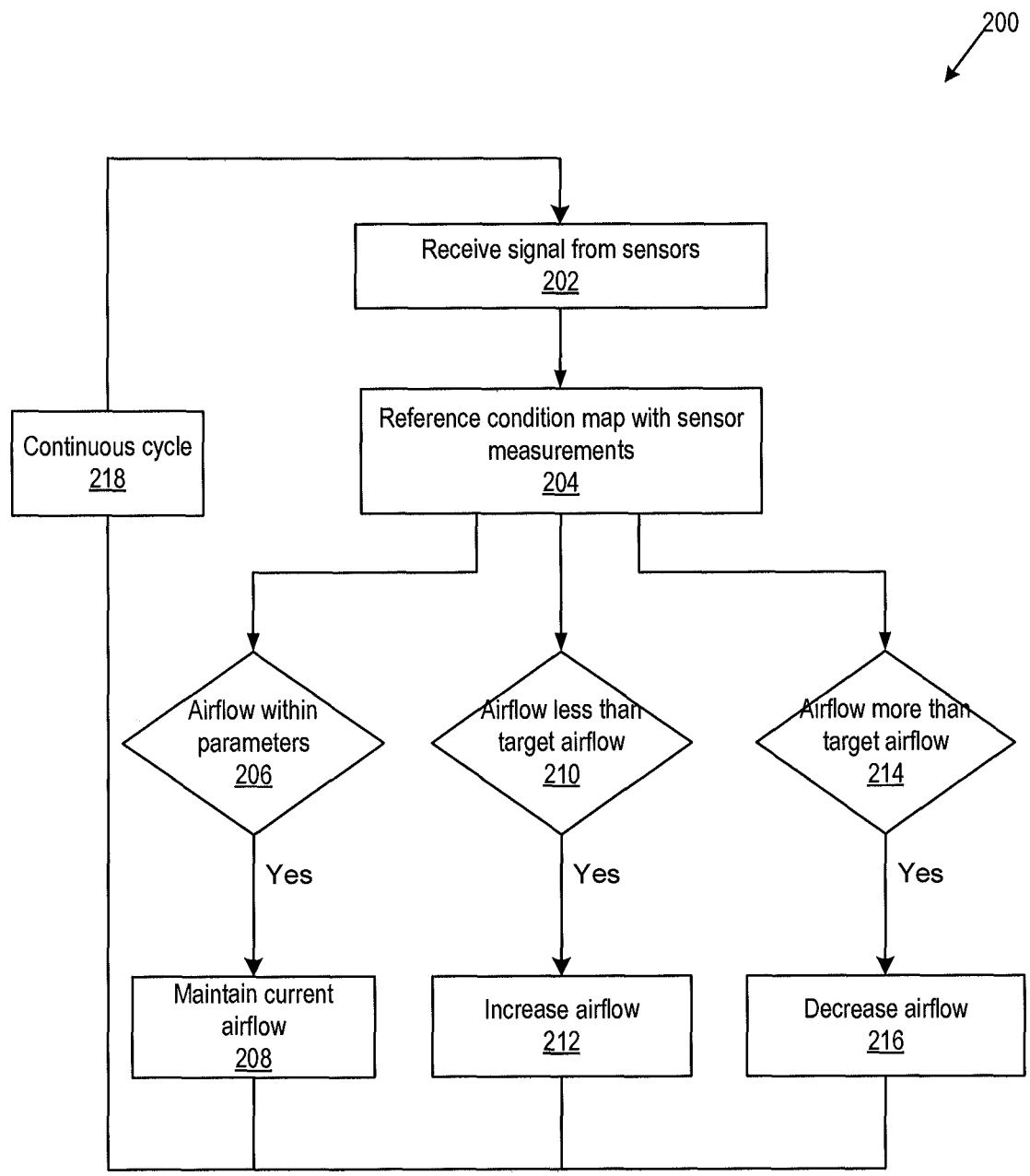
FIG. 2 is a flow chart of a method of controlling a turbine airflow system in accordance with the present invention.

FIG. 2 is a flow chart of a method 200 of controlling a turbine airflow system in accordance with the present invention.

FIG. 2 illustrates a control scheme, according to principles of this invention, for controlling mass air flow provided by the Forced Air Turbine. A condition map, stored in the memory of the Processor 130, contains target mass air flow under pre-specified sets of engine and turbine parameters. The Processor 130, receives engine and turbine parameters from the multiple sensors or from the Throttle Position Sensor 202. The Processor 130, compares the engine and turbine parameters to the stored condition map 204 and yields a target mass air flow stored in the Processor to be produced by the Forced Air Turbine.

The Processor 130, receives the actual mass air flow from sensors and Forced Air Turbine. If the actual mass air flow is less than the target mass air flow 210, the Processor uses the Forced Air Turbine electric motor to increase the actual mass air flow 212. If the actual mass air flow is greater than the target mass air flow 214, the Processor uses the Forced Air Turbine electric motor to decrease the actual mass air flow 216. If the mass air flow is within parameters 206, the Processor maintains the current conditions 208. The process of comparing the sensor information with the current mass air flow is a continuous cycle 218.

Figure 3:
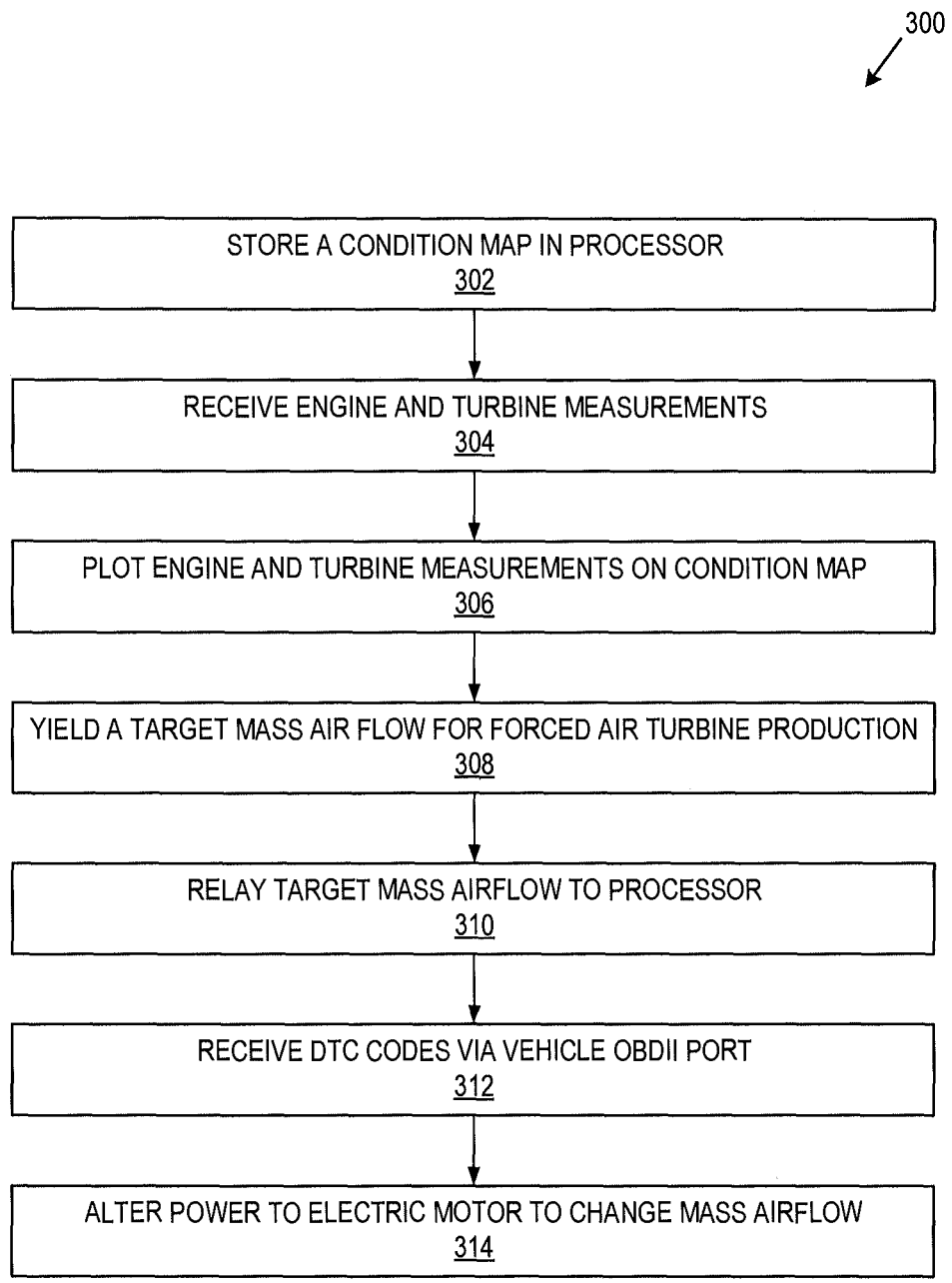
FIG. 3 is a flow chart of a method of controlling a turbine airflow system in accordance with the present invention.

FIG. 3 is a flow chart of a method 300 of controlling a turbine airflow system in accordance with the present invention.

The method 300 proceeds as shown.

In various embodiments of the present invention, the processor 130 is in logical communication with a vehicle through the vehicle's on board diagnostics (OBD), such as an OBDII port. The processor may receive DTC (diagnostic trouble codes) for use in mapping or associating electric motor commands with vehicle conditions.

In various embodiments of the present invention, the processor 130 may receive sensor 142-160 measurements and/or measurements from the vehicle itself via a standardized digital communication port 172 such as an OBDII port.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system for airflow control comprising:
 a turbine fan comprising:
  a housing defining a single conduit there through, the conduit further defined by first and second openings in the housing;
  an impeller shaft disposed within the housing to rotate around an axis;
  one or more vanes attached to the impeller shaft; and
  a motor to rotate the impeller shaft about the axis, wherein the rotation of the impeller shaft about the axis causes the vanes to generate thrust on air as it passes through the conduit in a direction parallel to the axis;

wherein the turbine fan allows backflow of air in a direction opposite the direction of the thrust being generated on the air, during the generation of the thrust, to prevent over pressurization causing engine damage;

a processor in electrical communication with the motor, the processor to receive sensor input and to control a speed of the motor and thereby a rotational speed of the impeller shaft, based on the sensor input; and one or more sensors in electrical communication with the processor to provide the sensor input.

2. The system of claim 1, wherein the one or more sensors comprises an airflow sensor.

3. The system of claim 2, wherein the one or more sensors further comprises a throttle position sensor.

4. The system of claim 2, wherein the system further comprises an engine air intake housing of a naturally aspirated engine; wherein the engine air intake housing is attached to the first opening in the housing.

5. The system of claim 4, wherein the system is configured to increase airflow into the engine air intake housing, wherein increasing the airflow into the engine air intake housing comprises increasing power to the motor to increase the rotational speed of the impeller shaft.

6. The system of claim 4, wherein the system is configured to decrease airflow into the engine air intake housing, wherein decreasing the airflow into the engine air intake housing comprises decreasing power to the motor to decrease the rotational speed of the impeller shaft.

7. The system of claim 4, wherein the system is configured to modify airflow into the engine air intake housing, wherein modifying the airflow into the engine air intake housing comprises modifying power to the motor to bring the rotational speed of the impeller shaft to zero.

8. The system of claim 4, wherein the system is configured to modify airflow into the engine air intake housing, wherein modifying the airflow into the engine air intake housing comprises modifying power to the motor to reverse the rotational direction of the impeller shaft.

9. A method for controlling airflow to an airflow intake of a combustion engine, comprising:

determining a current airflow amount from a signal provided from a sensor configured to detect the current airflow amount through a turbine fan;

determining a target airflow amount using a condition map stored on a processor;

comparing the current airflow amount to the target airflow amount; and adjusting an amount of power to a motor mechanically linked to an impeller shaft of the turbine fan to bring the current airflow amount to the target airflow amount;

wherein the turbine fan allows backflow of air in a direction opposite the direction of the thrust being generated on the air, during generation of the thrust, to prevent over pressurization that causes engine damage.

10. The method of claim 9, wherein the method further comprises determining a current engine characteristic from a signal provided from a sensor configured to detect the current engine characteristic; and wherein the condition map associates engine characteristic parameters with target airflow amounts.

11. The method of claim 10, wherein the method further comprises determining a current turbine fan characteristic from a signal provided from a sensor configured to detect the current turbine fan characteristic; and wherein the condition map associates turbine fan characteristic parameters with target airflow amounts.

12. The method of claim 10, wherein the condition map is one of a plurality of condition maps stored on memory accessible by the processor.

13. The method of claim 10, wherein the sensor configured to detect the current engine characteristic is a throttle position sensor.

14. A system for airflow control comprising:

a fan comprising:
a fan housing defining a single conduit there through, the conduit further defined by first and second openings in the fan housing;
an impeller shaft disposed within the fan housing to rotate around an axis;
one or more vanes attached to the impeller shaft; and
a motor to rotate the impeller shaft about the axis, wherein the rotation of the impeller shaft in a rotational direction about the axis causes the vanes to generate thrust on air as it passes through the conduit in a thrust direction parallel to the axis;
wherein the fan allows backflow of air opposite the thrust direction to prevent over pressurization causing engine damage, wherein the backflow of air is allowed while the impeller shaft continues to rotate in the rotational direction to generate the thrust on the air in the thrust direction;

a processor in electrical communication with the motor, the processor to receive sensor input and to control a speed of the motor and thereby a rotational speed of the impeller shaft, based on the sensor input; and one or more sensors in electrical communication with the processor to provide the sensor input.

15. The system of claim 14, wherein the one or more sensors comprises an airflow sensor.

16. The system of claim 14, wherein the one or more sensors comprises a throttle position sensor.

17. The system of claim 14, wherein the system further comprises an engine air intake housing of a naturally aspirated engine; wherein the engine air intake housing is attached to the first opening in the fan housing.

18. The system of claim 17, wherein the system is configured to increase airflow into the engine air intake housing, wherein increasing the airflow into the engine air intake housing comprises increasing power to the motor to increase the rotational speed of the impeller shaft.

19. The system of claim 17, wherein the system is configured to decrease airflow into the engine air intake housing, wherein decreasing the airflow into the engine air intake housing comprises decreasing power to the motor to decrease the rotational speed of the impeller shaft.

20. The system of claim 17, wherein the system is configured to modify airflow into the engine air intake housing, wherein modifying the airflow into the engine air intake housing comprises modifying power to the motor to reverse the rotational direction of the impeller shaft.

* * * * *